United States Patent [19]

Kondo

[11] Patent Number: 4,889,273
[45] Date of Patent: Dec. 26, 1989

[54] SOLDERING APPARATUS

[75] Inventor: Kenshi Kondo, Tokyo, Japan

[73] Assignee: Nihon Den-Netsu Keiki Co., Ltd., Tokyo, Japan

[21] Appl. No.: 207,228

[22] Filed: Jun. 16, 1988

[51] Int. Cl.$^4$ .............................................. B23K 3/06
[52] U.S. Cl. .................................... 228/8; 228/37; 228/102
[58] Field of Search .................. 228/8, 11, 37, 102, 228/260; 141/198; 164/449, 450; 118/429

[56] References Cited

U.S. PATENT DOCUMENTS 4,291,575  9/1981  Frissora ........................... 164/449
4,632,291  12/1986  Rahn et al. ........................ 228/37

FOREIGN PATENT DOCUMENTS 18977  6/1978  Japan .................................. 228/37

Primary Examiner—Richard K. Seidel
Assistant Examiner—Samuel M. Heinrich
Attorney, Agent, or Firm—Stephen F. K. Yee

[57] ABSTRACT

A soldering apparatus capable of forming a flowing layer of a molten solder with which an article to be soldered is contacted and the height of the upper surface of which is automatically controlled between predetermined upper and lower levels by continuously detecting the upper surface with two detectors. Each detector has a vertical pipe whose top is connected to a source of a pressurized gas and whose bottom is opened downward so that the pressure within the pipe is increased or released when the upper surface of the solder is positioned above or below the open bottom end of the pipe. A pressure switch is provided in each pipe to detect the increase and decrease of the pressure within the pipe to detect the upper surface of the solder layer.

3 Claims, 2 Drawing Sheets

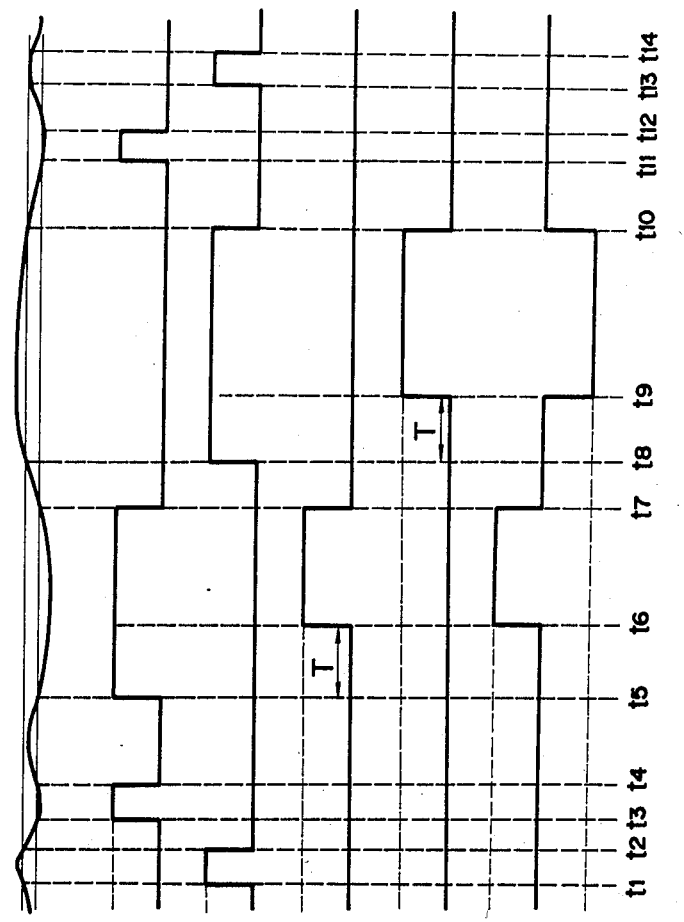

SOLDERING APPARATUS

BACKGROUND OF THE INVENTION

This invention relates generally to a soldering apparatus of a type in which an article to be soldered, traveling along a predetermined path, is brought into contact with a flowing layer of a molten solder and, more specifically, to a soldering apparatus of the above-mentioned type in which the height of the solder layer may be automatically adjusted within a predetermined range.

There is a known apparatus for soldering articles, such as printed circuit boards, traveling along a predetermined path of travel, which includes a vessel for containing a molten solder, a pump, and a solder applicator disposed in the vessel and having an injection nozzle or an overflow opening from which the molten solder in the vessel is ejected, upon driving of the pump, to form a wave or layer of the molten solder with which the article is contacted during its travel over the nozzle. The height of the upper surface of the wave or layer of the molten solder is maintained constant during the operation of the pump at a constant speed. However, the height of the upper surface of the solder layer is occasionally lowered due to, for example, consumption of the molten solder by soldering and oxidation. Therefore, it is necessary to control the operation speed of the pump in order to maintain the upper surface of the solder layer at a constant level.

Thus, one known apparatus uses two electrodes positioned at predetermined upper and lower levels and each adapted for generating a detecting signal when it is brought into contact with the solder layer. On the basis of the detecting signal, the operation speed of a pump is increased or decreased so as to maintain the upper surface of the solder layer between the upper and lower levels. In this case, however, the positions of the tip of the electrodes change when the solder deposits thereon. This adversely affects the precise control of the solder layer. Further, the deposits are oxidized by contact with air to form an electrically insulating film so that the electrodes fail to detect the upper level of the solder layer even if they come into contact with the solder layer. Therefore, in order to precisely control the level of the solder layer, it is necessary to remove the solder deposits from the electrodes as soon as possible. This is, however, troublesome and does not meet with automatic control of the level of the solder layer.

SUMMARY OF THE INVENTION

It is, therefore, an object of the present invention to provide an improved soldering apparatus of a type in which an article to be soldered is contacted with a flowing layer or wave of molten solder and in which the upper level of the solder layer is automatically controlled within a predetermined range.

Another object of the present invention is to provide a soldering apparatus of the above-mentioned type which is free of problems of surface detecting failures due to deposition of solder and oxidation of the solder deposits on the surfaces thereof.

In accomplishing the foregoing objects, the present invention provides a soldering apparatus comprising:

a solder vessel for containing a molten solder;

solder ejecting means disposed in said solder vessel and adapted for ejecting the molten solder therefrom;

feed means operable for feeding the molten solder in said solder vessel to said ejecting means so that a flowing layer of the molten solder is formed above said ejecting means during the operation of said feed means, the height of the upper surface of said layer being dependent upon the feed rate of the molten solder in said feed mean;

a source of a pressurized gas;

a first pipe having one end connected to said pressurized gas source and open ended at the other end at a first level so that the first pipe is closed by said layer of the molten solder to maintain the pressure therewithin in an increased state by confining the pressurized gas therein when the upper surface of said layer is positioned above said first level, the pressure within said first pipe being released by releasing the confined gas when the upper surface of said layer is positioned below said first level;

a second pipe having one end connected to said pressurized gas source and open ended at the other end at a second level higher than said first level so that the second pipe is closed by said layer of the molten solder to maintain the pressure therewithin in an increased state by confining the pressurized gas therein when the upper surface of said layer is positioned above said second level, the pressure in said second pipe being released by releasing the confined gas when the upper surface of said layer is positioned below said second level;

first means responsive to the pressure in said first pipe and maintained in an actuated state when the pressure in said first pipe is in the released state;

second means responsive to the pressure in said second pipe and maintained in an actuated state when the pressure in said second pipe is in the increased state; and control means coupled to said first and second means and said feed means and adapted to cause said feed means to operate so as to increase the feed rate of the molten solder when said first means is maintained in said actuated state for a period of time exceeding a first, predetermined period and to decrease the feed rate of the molten solder when said second means is maintained in said actuated state for a period of time exceeding a second, predetermined period of time.

In the above soldering apparatus, when the level of the solder layer is lowered below a predetermined, lower limit level (first level), the pressurized gas confined in the first pipe is discharged so that the pressure within the first pipe decreases. This is detected by the first pressure-responsive means, preferably a pressure switch, provided in the first pipe. If the position of the upper surface of the solder layer continues below the lower limit for a predetermined period of time, an instruction signal is supplied from the control means, such as a central computing unit to the feed means, such as a pump, to increase the feed rate of the molten solder. Similarly, when the level of the solder layer is raised above a predetermined, upper limit level (second level), the pressurized gas is confined in the second pipe so that the pressure within the second pipe increases. This is detected by the second pressure-responsive means, preferably a pressure switch, provided in the second pipe. If the position of the upper surface of the solder layer continues above the upper limit for a predetermined period of time, an instruction signal is supplied from the control means to the feed means to decrease the feed rate of the molten solder.

BRIEF DESCRIPTION OF THE DRAWINGS

Other objects, features and advantages of the present invention will become apparent from the detailed description of the preferred embodiment of the invention which follows, when considered in light of the accompanying drawings, in which:

FIGS. 2(a) through 2(f) are wave forms showing the operations of the apparatus of FIG. 1, FIG. 2(a) being an illustration of the change of the upper level of a molten solder layer, FIGS. 2(b) and 2(c) being wave forms of pressure switches, FIGS. 2(d) and 2(e) being wave forms of time detectors, and FIG. 2(f) being a wave form of a motor.

DESCRIPTION OF THE PREFERRED EMBODIMENT

Figure 1:
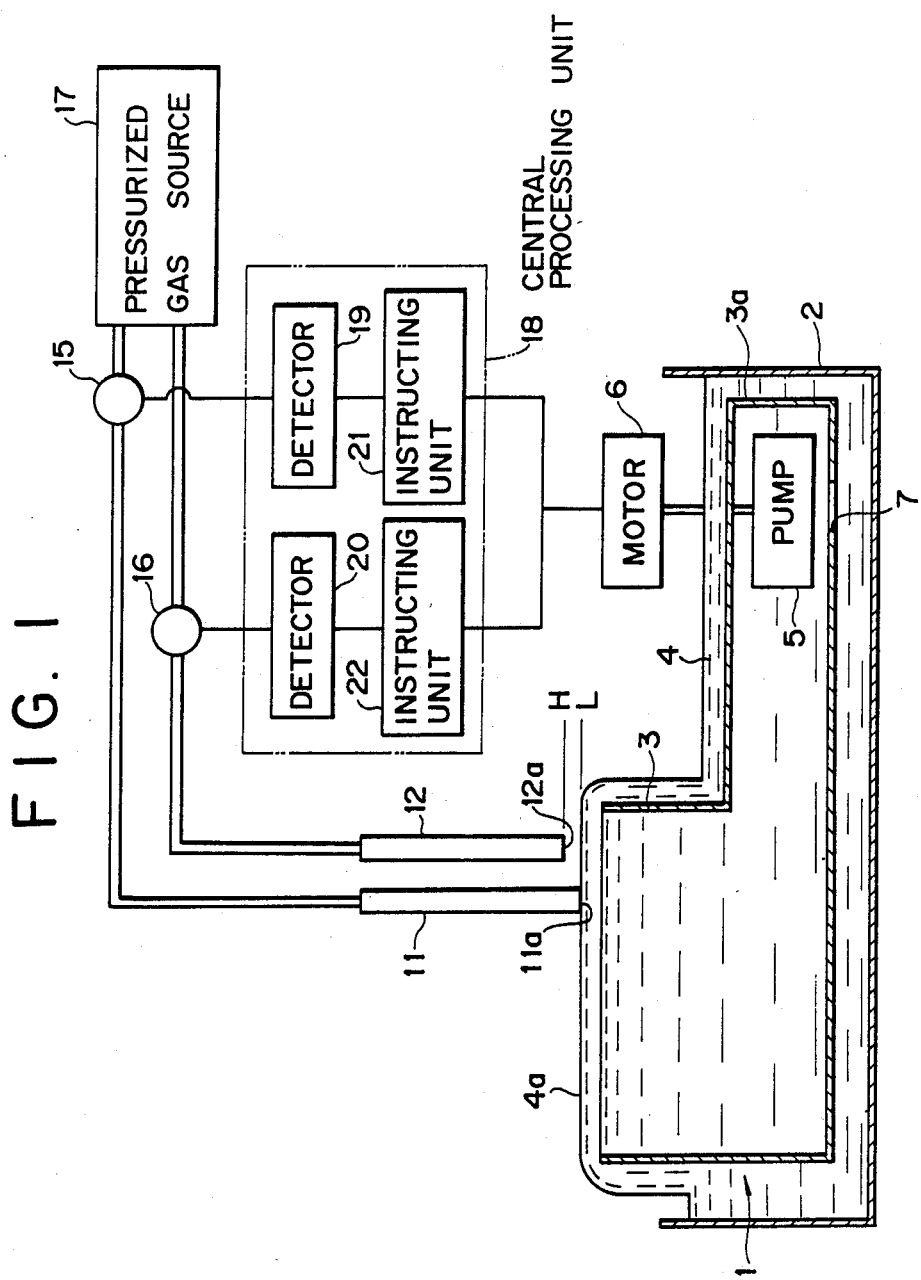
FIG. 1 is a schematic illustration, partly in cross section, of a soldering apparatus embodying the present invention.

Referring to FIG. 1, the reference numeral 2 denotes a solder vessel which is generally a rectangular in shape and which is open on the top side thereof. The vessel 2 contains a molten solder or melt 4 which is maintained at a suitable temperature by a heating element (not shown). The molten solder 4 is applied to articles to be soldered by solder ejecting means generally indicated by a reference numeral 1.

Disposed within the vessel 2 is an upwardly extending nozzle member 3, the lower end of which is connected to one end of a conduit 3a. At the other end, the conduit 3a is provided with a molten solder supply hole 7 which is opened toward the bottom of the vessel 2. Consequently, the lower portion of the nozzle member 3 is in flow communication with the vessel 2. The nozzle member 3 has an ejection hole or an overflow outlet 8 from which the molten solder 4 is ejected or overflowed.

A feed means is provided in the vessel 2 for continuously supplying the molten solder 4 in the vessel 2 to the nozzle member 3. The feed means preferably includes a pump 5 disposed in the conduit 3a adjacent to the opening 7. The pump 5 is connected to drive means including a motor 6 so that it is operated upon driving the motor 6 to supply the molten solder 4 in the vessel 2 continuously to the nozzle member 3. The supplied molten solder 4 flows upward through the nozzle member 3 and ejected or overflowed from the upper end 8 to form thereabove a flowing wave or layer 4a of the molten solder. An article to be soldered travelling along a predetermined path (not shown) is contacted with the solder layer 4a during its passage over the nozzle member 3. The molten solder is then returned to the vessel 2. The level of the upper surface of the solder layer 4a may be controlled by increasing or decreasing the feed rate of the molten solder in the pump 5.

Designated as 11 and 12 are first and second, hollow tubular member or pipes each having one end connected to a source 17 of a pressurized gas such as air or nitrogen. The first and second pipes 11 and 12 are open ended at the other ends 11a and 12a at predetermined, lower and upper levels L and H, respectively, between which the level of the upper surface of the solder layer 4a is to be adjusted. Preferably, the portions of the pipes 11 and 12 near the open ends 11a and 12a are each formed to have a larger cross section and are disposed in a vertical position as shown in FIG. 1. The pipes 11 and 12 may be formed, for example, of a stainless steel, etc. and have an inside diameter of, for example, 8-10 mm at the open end portions. The distance between the upper and lower levels H and L is, for example, in the range of 0.5-1.0 mm.

Thus, the first pipe 11 is closed when the upper surface of the solder layer 4a is raised above the lower level L but is opened when the upper surface of the solder layer 4a is lowered below the lower level L. Similarly, the second pipe 12 is closed and opened when the upper surface of the solder layer 4a is positioned above and below the upper level H, respectively. In the closed state, the pressure within each pipe 11 or 12 is maintained in an increased state because of confinement of the pressurized gas therein. In the open state, the pressure within each pipe 11 or 12 is maintained in a released state because the gas is discharged from the opening 11a or 12a.

First and second means 15 and 16 are provided in the first and second pipes 11 and 12, respectively, for detecting the pressure change in respective pipes. The first and second means 15 and 16 are preferably pressure switches capable of being actuated in response to the pressure conditions within the pipes 11 and 12. More particularly, the pressure switch 15 is turned ON when the pressure within the first pipe 11 is in a released state, i.e. when the level of the solder layer 4a is below the lower level L. The pressure switch 16, on the other hand, is turned ON when the pressure within the second pipe 12 is in an increased state, i.e. when the level of the solder layer 4a is above the upper level H.

Control means 18 such as a central computing unit (CPU) is coupled to the first and second pressure switches 15 and 16 and is also connected to the motor 6 of the pump 5 so as to increase or decrease the revolution speed of the motor 6, i.e. the feed rate of the molten solder in the pump 5, on the basis of the states of the first and second switches 15 and 16.

The CPU 18 includes first and second detectors 19 and 20 capable of generating detecting signals when the actuation time of the pressure switches 15 and 16 exceeds predetermined, first and second periods of time, respectively, and first and second instructing units 21 and 22 coupled to the first and second detectors 19 and 20, respectively. The first and second periods, which may be the same, are suitably selected with consideration of the degree of surging of the surface of the solder layer 4a, etc. but are generally each in the range of 3-30 sec. The detectors 19 and 20 continue to generate the detection signals during the actuation of the pressure switches 15 and 16, respectively.

The detection signals from the detectors 19 and 20 are supplied to the first and second instructing units 21 and 22, respectively, whereupon the first and second units 21 and 22 generate instruction signals which are supplied to the motor 6 to increase and decrease the revolution speed thereof, respectively.

The soldering apparatus having the above construction operates as follows. FIG. 2(a) shows the change of the surface level of the solder layer 4a with time, the surface level is raised above the upper level H between the periods of $t_1$ and $t_2$, $t_8$ and $t_{10}$, and $t_{13}$ and $t_{14}$ but is lowered below the lower level L between the periods of $t_3$ and $t_4$, $t_5$ and $t_7$ and, $t_{11}$ and $t_{12}$.

Referring to FIG. 1 and FIGS. 2(a) through 2(f), at point in time $t_1$, the surface level is raised beyond the upper level H. Thus, the switch 16 is turned ON in response to the increase in pressure within the pipe 12. Since the surface level has been spontaneously lowered below the upper level H (time point $t_2$) before lapse of a predetermined period of time T, the detector 20 does not generate a detection signal. Thus, the motor 6 continues to operate at a normal speed. At point in time $t_3$, the surface level is lowered below the lower level L. Thus, the switch 15 is turned ON in response to the pressure decrease in the pipe 11. The detector 19, however, does not generate a detection signal when the surface level has been raised above the lower level L at time point $t_4$ before the lapse of the time T, so that the motor 6 continues to operate at the normal speed.

At time point $t_5$, the surface level is again lowered below the lower level L due to, for example, the loss of the molten solder, so that the pressure switch 15 is turned ON. If the surface level continues below the lower level L after lapse of the predetermined period T, this is detected by the detector 19, thereby to start generating the detection signal at time point $t_6$. Thus, the motor 6 is caused to operate at a higher speed so as to raise the surface level. At time point $t_7$, the surface level is raised above the lower level L so that the pressure switch 15 is turned OFF, the detector 19 stops generating the detection signal and the motor 6 is operated at the normal speed.

At time point $t_8$, the surface level is raised above the upper level H due to, for example, the time lag between the point at which the speed of the motor 6 is decreased and the point at which the surface level actually stops rising. Thus, the switch 16 is turned ON. If the surface level is not lowered below the upper level H when the time period of T has lapsed, the detector 20 generates a signal at time point $t_9$ and the speed of the motor 6 is decreased. The motor 6 continues to operate at the decreased speed until the surface level is lowered below the upper level H (till $t_{10}$).

Between the time points $t_{10}$ and $t_{14}$, the surface level is moved up and down. Since the period of time for which the surface level is maintained outside of the range of between the upper and lower levels is shorter than the time period T, the detectors 19 and 20 do not generate detection signals, so that the motor 6 continues operating at the normal speed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A soldering apparatus comprising:
   a solder vessel for containing a molten solder;
   nozzle means disposed in said solder vessel and adapted for ejecting the molten solder therefrom;
   feed means operable for feeding the molten solder in said solder vessel to said nozzle means so that a flowing layer of the molten solder is formed above said nozzle means during the operation of said feed means, the height of the upper surface of said layer being controlled by the feed rate of the molten solder in said feed means;
   a source of a pressurized gas;
   a first pipe having one end connected to said pressurized gas source and open ended at the other end and positioned at a first level so that the open end of said first pipe is closed by said layer of the molten solder to maintain the pressure therewithin in an increased state by confining the pressurized gas therein when the upper surface of said layer is positioned above said first level during operation of said feed means, the pressure within said first pipe being released by releasing the confined gas when the upper surface of said layer falls below said first level;
   a second pipe having one end connected to said pressurized gas source and open ended at the other end and positioned at a second level higher than said first level so that the second pipe is closed by said layer of the molten solder to maintain the pressure therewithin in an increased state by confining the pressurized gas therein when the upper surface of said layer rises above said second level during operation of said feed means, the pressure in said second pipe being released by releasing the confined gas when the upper surface of said layer is below said second level;
   first pressure switch responsive to the pressure in said first pipe and maintained in an actuated state when the pressure in said first pipe is in the released state;
   second pressure switch responsive to the pressure in said second pipe and maintained in an actuated state when the pressure in said second pipe is in the increased state; and
   control means coupled to said first and second pressure switches and said feed means and adapted to cause said feed means to operate so as to increase the feed rate of the molten solder when said first pressure switch is maintained in said actuated state for a period of time exceeding a first, predetermined period and to decrease the feed rate of the molten solder when said second pressure switch is maintained in said actuated state for a period of time exceeding a second, predetermined period of time, thereby maintaining the surface height of the solder layer above the open end of the first pipe and below the open end of the second pipe.

2. A soldering apparatus as set forth in claim 1, wherein the separation distance between the open end of the first pipe and the open end of the second pipe is in the range of 0.5 to 1.0 mm.

3. A soldering apparatus as set forth in claim 1, further comprising transfer means for transferring an article to be soldered along a predetermined path of travel so that the article is contacted with the molten solder layer during the transference through the path.

* * * * *